US011152656B1

(12) United States Patent
Huang et al.

(10) Patent No.: US 11,152,656 B1
(45) Date of Patent: Oct. 19, 2021

(54) METHOD AND APPARATUS FOR CONTROLLING TEMPERATURE OF BATTERY PACK, BATTERY MANAGEMENT SYSTEM AND STORAGE MEDIUM

(71) Applicant: Contemporary Amperex Technology Co., Limited, Ningde (CN)

(72) Inventors: Siying Huang, Ningde (CN); Xiaojun Yang, Ningde (CN); Hao Sun, Ningde (CN); Langchao Hu, Ningde (CN); Jinmei Xu, Ningde (CN); Yanpeng Li, Ningde (CN); Guobao Wang, Ningde (CN); Shengkai Wu, Ningde (CN); Hai Ma, Ningde (CN); Zhibing Su, Ningde (CN)

(73) Assignee: Contemporary Amperex Technology Co.. Limited, Ningde (CN)

( * ) Notice: Subject to any disclaimer, the term of this patent is extended or adjusted under 35 U.S.C. 154(b) by 0 days.

(21) Appl. No.: 17/320,291

(22) Filed: May 14, 2021

Related U.S. Application Data

(63) Continuation of application No. PCT/CN2020/082093, filed on Mar. 30, 2020.

(51) Int. Cl.
*H01M 10/613* (2014.01)
*H01M 10/633* (2014.01)
*H02J 7/00* (2006.01)

(52) U.S. Cl.
CPC ....... *H01M 10/633* (2015.04); *H01M 10/613* (2015.04); *H02J 7/0048* (2020.01); *H01M 2220/20* (2013.01)

(58) Field of Classification Search
CPC ............. H01M 10/633; H01M 10/613; H01M 2220/20; H02J 7/0048
See application file for complete search history.

(56) References Cited

U.S. PATENT DOCUMENTS

| 10,573,941 B2 | 2/2020 | Toshiba |
| 2018/0115029 A1* | 4/2018 | Ren ................. H01M 10/633 |
| 2019/0097433 A1* | 3/2019 | Zou ................... H02J 7/007 |

FOREIGN PATENT DOCUMENTS

| CN | 106921003 A | 7/2017 |
| CN | 109861321 A | 6/2019 |
| CN | 110228396 A | 9/2019 |
| CN | 110901470 A | 3/2020 |

OTHER PUBLICATIONS

PCT International Search Report for PCT/CN2020/082093, dated Dec. 31, 2020, 15 pages.

* cited by examiner

*Primary Examiner* — Muhammad S Siddiquee
(74) *Attorney, Agent, or Firm* — Law Offices of Liaoteng Wang

(57) ABSTRACT

The present application relates to a method and an apparatus for controlling a temperature of a battery pack, a battery management system, and a storage medium. The method for controlling a temperature of a battery pack includes: detecting a SOC of the battery pack; determining a SOC interval in which the SOC is located from a plurality of preset SOC intervals; determining a target temperature threshold corresponding to the SOC interval under a condition that a preset battery pack life requirement is met, based on a mapping relationship between preset SOC intervals, target temperature thresholds and battery pack life; and performing thermal management on the battery pack based on the target temperature threshold; where the performing thermal management on the battery pack based on the target temperature threshold comprises cooling the battery pack based on the target temperature threshold.

12 Claims, 2 Drawing Sheets

METHOD AND APPARATUS FOR CONTROLLING TEMPERATURE OF BATTERY PACK, BATTERY MANAGEMENT SYSTEM AND STORAGE MEDIUM

CROSS-REFERENCE TO RELATED APPLICATIONS

This application is a continuation of International Application No. PCT/CN2020/082093, filed on Mar. 30, 2020, which is hereby incorporated by reference in their entireties.

TECHNICAL FIELD

The present application relates to the field of battery technology, and in particular to a method and an apparatus for controlling a temperature of a battery pack, a battery management system and a storage medium.

BACKGROUND

Battery life of an electric vehicle can be optimized through temperature control. For example, battery life can be extended by keep the battery operating at a relatively low temperature through battery cooling. However, cooling the battery will in turn increase energy consumption and reduce the vehicle's mileage.

SUMMARY

The present application is to provide a method and an apparatus for controlling a temperature of a battery pack, a battery management system and a storage medium, in order to achieve that a balance between battery life and energy consumed by cooling can be realized, so that the cooling energy consumed by cooling is minimized while the battery life is maximized.

In a first aspect, embodiments of the present application provide a method for controlling a temperature of a battery pack, which includes:
  detecting a SOC of the battery pack;
  determining a SOC interval in which the SOC is located from a plurality of preset SOC intervals;
  determining a target temperature threshold corresponding to the SOC interval under a condition that a preset battery pack life requirement is met, based on a mapping relationship between preset SOC intervals, target temperature thresholds and battery pack life; and
  performing thermal management on the battery pack based on the target temperature threshold;
  where the performing thermal management on the battery pack based on the target temperature threshold includes:
  cooling the battery pack based on the target temperature threshold.

In a possible implementation of the first aspect, before the determining a target temperature threshold corresponding to the SOC interval, based on a mapping relationship between preset SOC intervals, target temperature thresholds and battery pack life, the method further includes: determining a mapping relationship of battery pack life with average battery pack SOC values and average battery pack temperature values, based on historical SOC data and historical temperature data of a plurality of battery packs meeting the preset battery pack life requirement; determining an average temperature value interval corresponding to each SOC interval of the plurality of preset SOC intervals under the condition that the preset battery pack life requirement is met, based on the mapping relationship of battery pack life with average battery pack SOC values and average battery pack temperature values; and determining a minimum temperature in the average temperature value interval corresponding to each SOC interval of the plurality of preset SOC intervals as a target temperature threshold corresponding to the respective SOC interval, so that the mapping relationship between preset SOC intervals, target temperature thresholds and battery pack life is obtained.

In a possible implementation of the first aspect, where the determining a mapping relationship of battery pack life with average battery pack SOC values and average battery pack temperature values, based on historical SOC data and historical temperature data of a plurality of battery packs meeting the preset battery pack life requirement specifically includes: calculating an average value of historical SOC data and an average value of the historical temperature data of each battery pack of the plurality of battery packs meeting the preset battery pack life requirement, to obtain an average SOC value and an average temperature value of each battery pack of the plurality of battery packs; and obtaining the mapping relationship of battery pack life with average battery pack SOC values and average battery pack temperature values, based the average SOC value and the average temperature value of each battery pack of the plurality of battery pack.

In a possible implementation of the first aspect, before the determining a SOC interval in which the SOC is located from a plurality of preset SOC intervals, the method further includes: acquiring historical SOC data of a plurality of battery packs with different battery life; calculating an average value of historical SOC data of each battery pack of the plurality of battery packs, to obtain an average SOC value of each battery pack of the plurality of battery packs; determining a mapping relationship between average battery pack SOC values and battery pack capacity retention ratios, based on the average SOC value of each battery pack and a capacity retention ratio of each battery pack at the end of its battery life; and determining the plurality of preset SOC intervals, based on the mapping relationship between average battery pack SOC values and battery pack capacity retention ratios.

In a possible implementation of the first aspect, the determining the plurality of preset SOC intervals, based on the mapping relationship between average battery pack SOC values and battery pack capacity retention ratios, specifically includes: obtaining a variation curve of battery pack capacity retention ratio versus average SOC value, based on the mapping relationship between average battery pack SOC values and battery pack capacity retention ratios; acquiring a SOC interval point on the variation curve of battery pack capacity retention ratio versus average SOC value, where a slope change rate of the variation curve of battery pack capacity retention ratio versus average SOC value at the SOC interval point is greater than a preset change threshold; dividing, based on the SOC interval point, the variation curve of battery pack capacity retention ratio versus average SOC value into a plurality of curve segments; and determining a plurality of SOC intervals corresponding to the plurality of curve segments as the plurality of preset SOC intervals.

In a possible implementation of the first aspect, the cooling the battery pack specifically includes: determining a cooling-enabling threshold corresponding to the SOC interval, where the cooling-enabling threshold is greater than or equal to the target temperature threshold corresponding to the SOC interval; enabling cooling of the battery pack, when the temperature of the battery pack is greater than or equal to the cooling-enabling threshold and an electric vehicle where the battery pack is located is in a working state; disabling the cooling of the battery pack, when the temperature of the battery pack is less than the cooling-enabling threshold; and disabling the cooling of the battery pack, when the electric vehicle where the battery pack is located is in an off-working state.

In a possible implementation of the first aspect, after the enabling cooling of the battery pack, the method further includes: determining a cooling-disabling threshold corresponding to the SOC interval, where the cooling-disabling threshold is less than the target temperature threshold corresponding to the SOC interval; disabling the cooling of the battery pack, when the temperature of the battery pack is less than the cooling-disabling threshold; or, acquiring an ambient temperature value of the battery pack; disabling the cooling of the battery pack, when the temperature of the battery pack is less than a larger one of the cooling-disabling threshold and the ambient temperature value.

In a possible implementation of the first aspect, the plurality of preset SOC intervals include:

an interval A corresponding to a SOC range from 0% to 60%;

an interval B corresponding to a SOC range from 60% to 70%;

an interval C corresponding to a SOC range from 70% to 80%; and an interval D corresponding to a SOC range from 80% to 100%.

In a possible implementation of the first aspect, a target temperature threshold corresponding to the interval A is $T_{C1}$ ranging from 43° C. to 47° C.;

a target temperature threshold corresponding to the interval B is $T_{C2}$ ranging from 39° C. to 43° C.;

a target temperature threshold corresponding to the interval C is $T_{C3}$ ranging from 29° C. to 39° C.; and a target temperature threshold corresponding to the interval D is $T_{C4}$ ranging from 27° C. to 29° C.

In a second aspect, the embodiments of the present application provide an apparatus for controlling a temperature of a battery pack, which includes:

a detecting module configured to detect a SOC of the battery pack;

a first determining module configured to determine a SOC interval in which the SOC is located from a plurality of preset SOC intervals;

a second determining module configured to determine a target temperature threshold corresponding to the SOC interval under a condition that a preset battery pack life requirement is met, based on a mapping relationship between preset SOC intervals, target temperature thresholds and battery pack life; and a thermal managing module configured to perform thermal management on the battery pack based on the target temperature threshold;

where thermal managing module is specifically configured to cool the battery pack based on the target temperature threshold.

In a third aspect, the embodiments of the present application provide a battery management system including a processor, a memory, and a computer program stored on the memory and executable on the processor, where the computer program, when being executed by the processor, implements the steps of the method for controlling the temperature of the battery pack described above.

In a fourth aspect, the embodiments of the present application provide a computer-readable storage medium having a computer program is stored thereon, where the computer program, when being executed by a processor, implements the steps of the method for controlling the temperature of the battery pack described above.

As mentioned above, according to the method for controlling the temperature of the battery pack provided by the embodiments of the present application, the SOC of the battery pack is detected first. The SOC interval in which the SOC is located is determined from the plurality of preset SOC intervals. Then the target temperature threshold corresponding to the SOC interval is determined under the condition that the preset battery pack life requirement is met, based on the mapping relationship between preset SOC intervals, target temperature thresholds and battery pack life. Finally, the thermal management is performed on the battery pack based on the target temperature threshold, where the thermal management includes cooling the battery pack so that the temperature of the battery pack is lower than the target temperature threshold. That is to say, the cooling of the battery pack will not be continued as long as the temperature of the battery pack is lower than the target temperature threshold; otherwise, the battery pack would be overly cooled, resulting in the waste of energy consumed by cooling. At the same time, because the target temperature threshold is the temperature corresponding to the SOC range under the condition that the preset battery pack life requirement is met, even if the cooling of the battery pack is not continued, the battery pack life requirement can still be met. Therefore, according to the method for controlling the temperature of the battery pack provided by the embodiments of the present application, a balance between battery life and energy consumed by cooling can be realized, so that the energy consumed by cooling is minimized while the battery life is maximized.

DESCRIPTION OF THE DRAWINGS

Features, advantages and technical effects of exemplary embodiments of the present application will be described below with reference to the drawings, which are not drawn to actual scale.

DETAILED DESCRIPTION

Features of various aspects of the present application and exemplary embodiments will be described in detail below. In the following detailed description, many specific details are proposed in order to provide a thorough understanding of this application.

Figure 1:
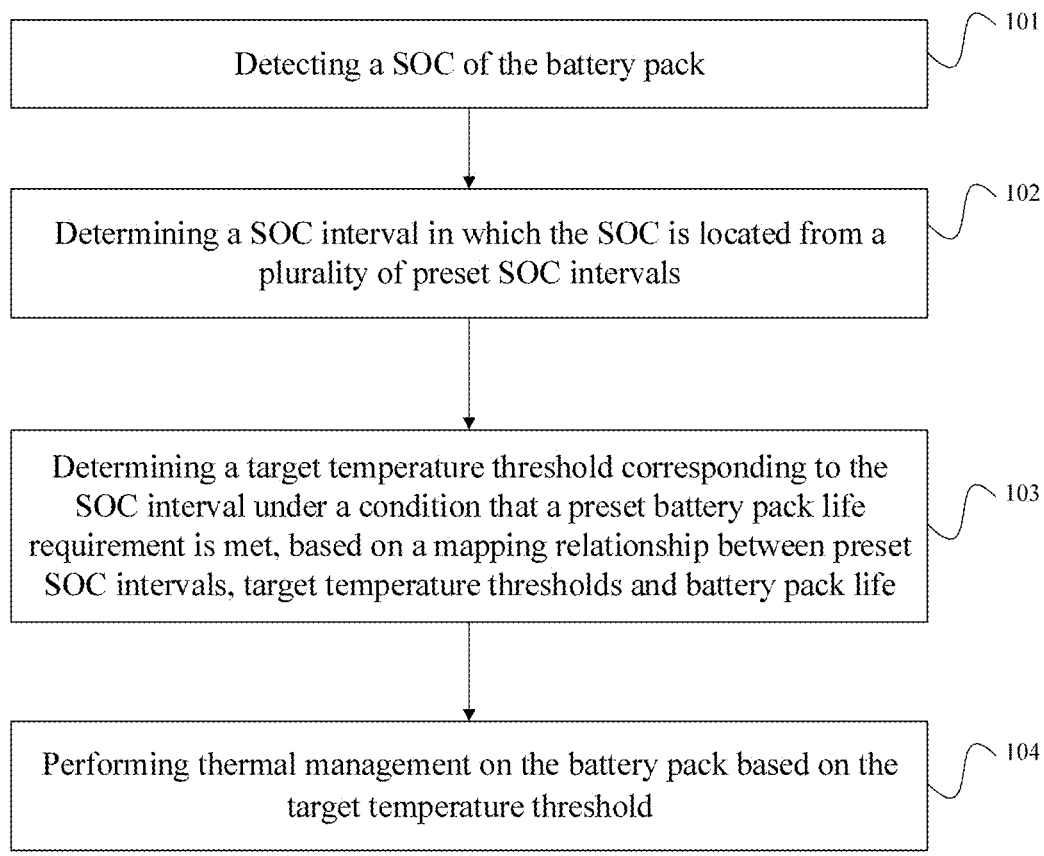
FIG. 1 illustrates a schematic flowchart of a method for controlling a temperature of a battery pack, according to an embodiment of the present application.

The embodiments of the present application provide a method and an apparatus for controlling a temperature of a battery pack, a battery management system and a storage medium. FIG. 1 illustrates a schematic flowchart of a method for controlling a temperature of a battery pack, according to an embodiment of the present application. As shown in FIG. 1, the method for controlling the temperature of the battery pack includes steps 101 to 104.

Step 101: detecting a SOC of the battery pack.

Step 102: determining a SOC interval in which the SOC is located from a plurality of preset SOC intervals.

Specifically, the plurality of preset SOC intervals may be determined based on a mapping relationship between average battery pack SOC values and battery pack capacity retention ratios. In order to obtain the mapping relationship between average battery pack SOC values and battery pack capacity retention ratios, historical SOC data of a plurality of battery packs with different battery life are required to be acquired first; an average value of historical SOC data of each battery pack of the plurality of battery packs is calculated, to obtain an average SOC value of each battery pack of the plurality of battery packs; and then the mapping relationship between average battery pack SOC values and battery pack capacity retention ratios is determined, based on the average SOC value of each battery pack and a capacity retention ratio of each battery pack at the end of its battery life.

It is to be understood that the average SOC value refers to an average value of all SOC data over the entire life cycle of a battery pack. Life parameters of a battery pack include its service life and capacity retention. For example, the battery pack life standard requires a battery's capacity retention ratio to be 80% or more after 6 years of use, or a battery's capacity retention ratio to be 75% or more after 8 years of use.

In some embodiments, the average SOC value may be calculated from historical SOC data over the entire life cycle of a battery pack. If the historical SOC data is not sufficient to completely cover the entire life cycle of the battery pack, SOC data over its remaining life cycle may be estimated based on the existing SOC data, and then the average SOC value may be calculated. The type of SOC data prediction model will not be limited herein.

The overall influence degrees of average battery pack SOC values on battery pack life (reflected in the battery pack capacity retention ratios) may be quantified based on the mapping relationship between average battery pack SOC values and battery pack capacity retention ratios, so that SOCs may be divided into a plurality of SOC intervals based on the influence degrees of the average battery pack SOC values on the battery pack capacity retention ratios.

Specifically, a variation curve of battery pack capacity retention ratio versus average SOC value may be obtained, based on the mapping relationship between average battery pack SOC values and battery pack capacity retention ratios. Then a SOC interval point on the variation curve of battery pack capacity retention ratio versus average SOC value may be acquired, where a slope change rate of the variation curve of battery pack capacity retention ratio versus average SOC value at the SOC interval point is greater than a preset change threshold. Finally, the variation curve of battery pack capacity retention ratio versus average SOC value may be divided into a plurality of curve segments based on the SOC interval point, and a plurality of SOC intervals corresponding to the plurality of curve segments may be determined as the plurality of preset SOC intervals.

Figure 2:
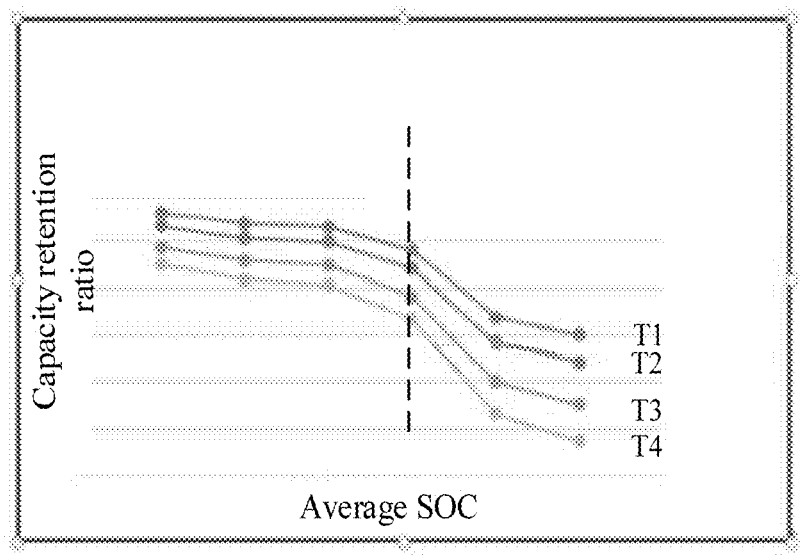
FIG. 2 illustrates a schematic diagram of variation curves of battery pack capacity retention ratio versus average SOC value, according to an embodiment of the present application.

FIG. 2 illustrates a schematic diagram of variation curves of battery pack capacity retention ratio versus average SOC value, according to an embodiment of the present application. FIG. 2 illustrates variation curves of battery pack capacity retention ratio versus average SOC value under four average temperature values, T1, T2, T3 and T4, where T1<T2<T3<T4.

It can be seen from FIG. 2 that the variation trends of battery pack capacity retention ratio with average SOC value are the same under different average temperature values. As the average SOC values increase, the battery pack capacity retention ratios have a trend of decreasing. When the average SOC values increase to a relatively high value (the position indicated by the dotted line), decreasing speeds of battery pack capacity retention ratios have a trend of sharp increasing. SOCs may be divided into a plurality of SOC intervals based on the decreasing speeds of the battery pack capacity retention ratios.

In addition, it can be seen from FIG. 2 that for a same SOC value, the battery pack capacity retention ratio increases as the average temperature value decreases, and the battery pack life is more affected by temperature in the interval of high SOC values. Therefore, in the interval of high SOC values, a temperature of a battery pack may be controlled to be in a relatively low range as appropriate to maximize its battery life. In the interval of low SOC values, the temperature of the battery pack can be relaxed to a relatively high range to minimize the energy consumed by cooling.

Step 103: determining a target temperature threshold corresponding to the SOC interval under a condition that a preset battery pack life requirement is met, based on a mapping relationship between preset SOC intervals, target temperature thresholds and battery pack life.

Specifically, step 103 may include steps S1-S3:

S1: determining a mapping relationship of battery pack life with average battery pack SOC values and average battery pack temperature values, based on historical SOC data and historical temperature data of a plurality of battery packs meeting the preset battery pack life requirement.

Specifically, after the historical SOC data and historical temperature data of the plurality of battery packs meeting the preset battery pack life requirement are obtained, an average value of historical SOC data and an average value of historical temperature data of each battery pack of the plurality of battery packs may be calculated, to obtain an average SOC value and an average temperature value of each battery pack of the plurality of battery packs. The mapping relationship of battery pack life with average battery pack SOC values and average battery pack temperature values may be obtained, based on the average SOC value and the average temperature value of each battery pack of the plurality of battery pack.

The overall influence degrees of average battery pack SOC values and average battery life temperature values on battery pack life (that is, the battery pack capacity retention ratio) may be quantified based on the mapping relationship of battery pack capacity retention ratios with average battery pack SOC values and average battery pack temperature values.

Figure 3:
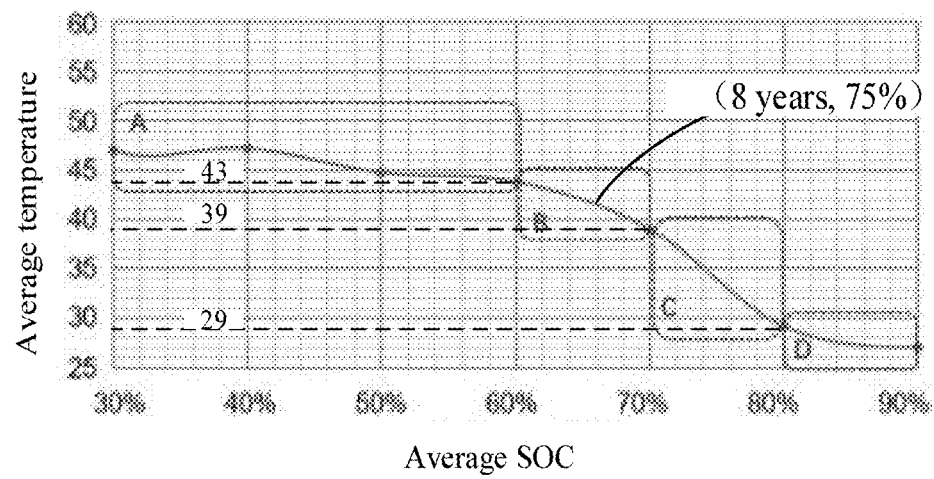
FIG. 3 illustrates a schematic diagram of a mapping relationship of battery pack life with average battery pack SOC values and average battery pack temperature values, according to an embodiment of the present application.

FIG. 3 illustrates a schematic diagram of a mapping relationship of battery pack life with average battery pack SOC values and average battery pack temperature values, according to an embodiment of the present application. FIG. 3 shows boundaries for the average SOC value and the average temperature value when the capacity retention ratio of a battery pack after 8 years of use is 75%. The region above the boundary indicates that the capacity retention ratio of the battery pack after 8 years of use is less than 75%, and the region below the boundary indicates that the capacity retention ratio of the battery pack after 8 years of use is greater than 75%.

In some embodiments, the average SOC value may be calculated from historical SOC data over the entire life cycle of a battery pack. If the historical SOC data is not sufficient to completely cover the entire life cycle of the battery pack, SOC data over its remaining life cycle may be estimated based on the existing SOC data, and then the average SOC value may be calculated. The type of SOC data prediction model will not be limited herein.

In some embodiments, the average temperature value may be calculated from historical temperature data over the entire life cycle of a battery pack. If the historical temperature data is not sufficient to completely cover the entire life cycle of the battery pack, temperature data over its remaining life cycle may be estimated based on the existing temperature data, and then the average temperature value may be calculated. The type of temperature data prediction model will not be limited herein.

S2: determining an average temperature value interval corresponding to each SOC interval of the plurality of preset SOC intervals under the condition that the preset battery pack life requirement is met, based on the mapping relationship of battery pack life with average battery pack SOC values and average battery pack temperature values.

S3: determining a minimum temperature in the average temperature value interval corresponding to each SOC interval of the plurality of preset SOC intervals as a target temperature threshold corresponding to the respective SOC interval, so that the mapping relationship between preset SOC intervals, target temperature thresholds and battery pack life is obtained.

For example, the preset SOC intervals and the target temperature thresholds corresponding to the respective SOC intervals may be determined in the manner as shown in Table 1.

TABLE 1

| SOC Interval | Range of SOC | Target Temperature Threshold |
| --- | --- | --- |
| A | 0~60% | 43° C. |
| B | 60%~70% | 39° C. |
| C | 70%~80% | 29° C. |
| D | 80%~100% | 27° C. |

As shown in Table 1, the SOC range corresponding to the interval A is from 0 to 60%; the SOC range corresponding to the interval B is from is 60% to 70%; the SOC range corresponding to the interval C is from 70% to 80%; and the SOC range corresponding to the interval D is from is 80% to 100%.

For the interval A, a boundary segment corresponding to the interval A is determined first, and then an average temperature value range corresponding to the boundary segment is determined as from 43° C. to 47° C.

For the interval B, a boundary segment corresponding to the interval B is determined first, and then an average temperature value range corresponding to the boundary segment is determined as from 39° C. to 43° C.

For the interval C, a boundary segment corresponding to the interval C is determined first, and then an average temperature value range corresponding to the boundary segment is determined as from 29° C. to 39° C.

For the interval D, a boundary segment corresponding to the interval D is determined first, and then an average temperature value range corresponding to the boundary segment is determined as from 27° C. to 29° C.

Accordingly, 43° C. may be taken as the target temperature threshold corresponding to the interval A, 39° C. may be taken as the target temperature threshold corresponding to the interval B, 29° C. may be taken as the target temperature threshold corresponding to the interval C, and 27° C. may be taken as the target temperature threshold corresponding to the interval D.

In some embodiments, a median value of the average temperature value range corresponding to each SOC interval may also be taken as the target temperature threshold of the corresponding SOC interval.

In some embodiments, respective average temperature values in the average temperature value ranges corresponding to the SOC intervals respectively may also be weighted based on the change in slope at the temperature boundary corresponding to the respective SOC interval, to obtain the target temperature threshold corresponding to the respective SOC interval, where the greater the slope change, the higher the weighting factor of the corresponding average temperature.

It should be noted that according to the mapping relationship of battery pack life with average battery pack SOC values and average battery pack temperature values shown in FIG. 3, the battery pack life standard requires a battery's capacity retention ratio to be 75% after 8 years of use. According to different requirements of the life standard, the mapping relationship of battery pack life with average battery pack SOC values and average battery pack temperature values may be different. The boundaries of the corresponding average SOC value and the average temperature value will also be different, and the target temperature threshold of each SOC interval will also change accordingly.

For example, ranges of target temperature threshold under different life standard requirements may be as follows: the target temperature threshold is $T_{C1}$ when the SOC interval is from 0 to 60%, and the range of $T_{C1}$ is from 43° C. to 47° C.; the target temperature threshold is $T_{C2}$ when the SOC interval is from 60 to 70%, and the range of $T_{C2}$ is from 39° C. to 43° C.; the target temperature threshold is $T_{C3}$ when the SOC interval is from 70 to 80%, and the range of $T_{C3}$ is from 29° C. to 39° C.; and the target temperature threshold is $T_{C4}$ when the SOC interval is from 80 to 100%, and the range of $T_{C4}$ is from 27° C. to 29° C.

Step 104: performing thermal management on the battery pack based on the target temperature threshold.

The step 104 specifically includes: cooling the battery pack based on the target temperature threshold.

The target temperature threshold refers to a critical temperature value, where the battery pack life requirement can be met without cooling the battery pack when the temperature of the battery pack is below the critical temperature value.

As mentioned above, according to the method for controlling the temperature of the battery pack provided by the embodiments of the present application, the SOC of the battery pack is detected first. The SOC interval in which the SOC is located is determined from the plurality of preset SOC intervals. Then the target temperature threshold corresponding to the SOC interval is determined under the condition that the preset battery pack life requirement is met, based on the mapping relationship between preset SOC intervals, target temperature thresholds and battery pack life. Finally, the thermal management is performed on the battery pack based on the target temperature threshold, where the thermal management includes cooling the battery pack so that the temperature of the battery pack is lower than the target temperature threshold. That is to say, it is unnecessary to continue the cooling of the battery pack as long as the temperature of the battery pack is lower than the target temperature threshold; otherwise, the battery pack would be overly cooled, resulting in the waste of energy consumed by cooling. At the same time, because the target temperature threshold is the temperature corresponding to the SOC range under the condition that the preset battery pack life requirement is met, even if the cooling of the battery pack is not continued, the battery pack life requirement can still be met. Therefore, according to the method for controlling the temperature of the battery pack provided by the embodiments of the present application, a balance between battery life and energy consumed by cooling can be realized, so that the cooling energy consumed by cooling is minimized while the battery life is maximized.

Execution policies of cooling enabling and cooling disabling are described in detail below.

In the embodiments of the present application, a cooling-enabling threshold and a cooling-disabling threshold corresponding to each SOC interval may be pre-determined.

In some embodiments, the cooling-enabling threshold corresponding to each SOC interval may be greater than or equal to the target temperature threshold of the respective SOC interval, and the cooling-disabling threshold corresponding to each SOC interval may be less than the target temperature threshold of the respective SOC interval.

In some embodiments, cooling-enabling thresholds and cooling-disabling thresholds corresponding to respective SOC intervals may be set as shown in Table 2.

TABLE 2

| Interval | SOC Interval | Target Temperature Threshold | Cooling-enabling threshold | Cooling-disabling threshold |
| --- | --- | --- | --- | --- |
| A | 0~60% | 43° C. | 45° C. | 30° C. |
| B | 60%~70% | 39° C. | 40° C. | 30° C. |
| C | 70%~80% | 29° C. | 32° C. | 25° C. |
| D | 80%~100% | 27° C. | 30° C. | 20° C. |

As shown in Table 2, when the target temperature threshold is 43° C., the cooling-enabling threshold may be 45° C., and the cooling-disabling threshold may be 30° C.; when the target temperature threshold is 39° C., the cooling-enabling threshold may be 40° C., and the cooling-disabling threshold may be 30° C.; when the target temperature threshold is 29° C., the cooling-enabling threshold may be 32° C., and the cooling-disabling threshold may be 25° C.; when the target temperature threshold is 27° C., the cooling-enabling threshold may be 30° C. and the cooling-disabling threshold may be 20° C. The values of the cooling-enabling thresholds and the cooling-disabling thresholds shown in Table 2 are only for illustration. In addition, the cooling-enabling threshold should not be too large compared with the target temperature threshold, as an overly large cooling-enabling threshold will result in reduction of the battery life; and the cooling-disabling threshold should not be too small compared with the target temperature threshold, as an overly small cooling-disabling threshold will result in increase of the energy consumed by cooling, and the values of cooling-enabling threshold and cooling-disabling threshold may be set according to actual demands.

In some embodiments, after step 104, the method for controlling the temperature of the battery pack may further include: determining a cooling-disabling threshold corresponding to the SOC interval; if the temperature of the battery pack is greater than or equal to the cooling-enabling threshold of the SOC interval and the electric vehicle where the battery pack is located is in a working state, enabling the cooling of the battery pack; or, if the temperature of the battery pack is less than the cooling-enabling threshold, disabling the cooling of the battery pack to reduce energy consumed by cooling.

In actual practice, for a battery, the harshest working condition is fast charging and the rest after the fast charging; and for an electric vehicle, the harshest working condition is that the vehicle is being wildly driven. A lot of heat will be generated in those working conditions, thus increasing the temperature of the battery. Thus, it is necessary to cool the battery in time to extend the life of the battery pack and ensure the safety of the vehicle. Therefore, if the electric vehicle where the battery pack located is in an off-working state, the cooling of the battery pack will not be enabled to reduce the energy consumed by cooling.

In some embodiments, after step 104, the method for controlling the temperature of the battery pack may further include: determining the cooling-disabling threshold corresponding to the SOC interval, and disabling the cooling of the battery pack if the temperature of the battery pack is lower than the cooling-disabling threshold corresponding to the SOC interval, so as to reduce the energy consumed by cooling.

In some embodiments, after step 104, the method for controlling the temperature of the battery pack may further include: acquiring an ambient temperature value of the battery pack, and disabling the cooling of the battery pack if the temperature of the battery pack is less than the larger one of the cooling-disabling threshold and the ambient temperature value.

For example, if the cooling-disabling threshold is 30° C. and the ambient temperature is 35° C., the cooling of the battery pack will be disabled when the temperature of the battery pack is cooled below 35° C. In this manner, the temperature of the battery cells will not be cooled to a temperature lower than the ambient temperature, otherwise the battery pack would be heated by the environment, which results in excessive cooling and unnecessary energy loss caused by cooling.

Figure 4:
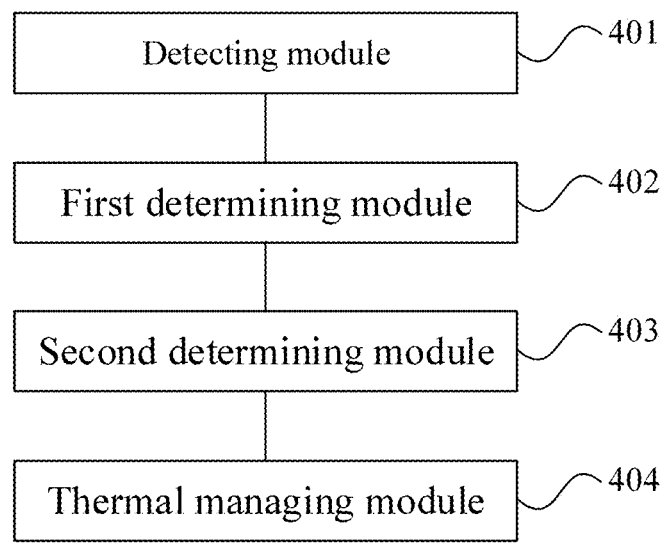
FIG. 4 illustrates a schematic structural diagram of an apparatus for controlling a temperature of a battery pack, according to an embodiment of the present application.

FIG. 4 shows a schematic structural diagram of an apparatus for controlling a temperature of a battery pack according to an embodiment of the present application. As shown in FIG. 4, the apparatus for controlling the temperature of the battery pack provided by the embodiments of the present application includes the following modules:

a detection module 401 configured to detect a SOC of the battery pack;

a first determining module 402 configured to determine a SOC interval in which the SOC is located from a plurality of preset SOC intervals;

a second determining module 403 configured to determine a target temperature threshold corresponding to the SOC interval under a condition that a preset battery pack life requirement is met, based on a mapping relationship between preset SOC intervals, target temperature thresholds and battery pack life; and a thermal managing module 404 configured to perform thermal management on the battery pack based on the target temperature threshold, where the thermal managing module is specifically configured to cool the battery pack based on the target temperature threshold.

As mentioned above, according to the apparatus for controlling the temperature of the battery pack provided by the embodiments of the present application, the SOC of the battery pack is detected by the detecting module 401 first. The SOC interval in which the SOC is located is determined from the plurality of preset SOC intervals by the first determining module 402. Then the target temperature threshold corresponding to the SOC interval is determined by the second determining module 403 under the condition that the preset battery pack life requirement is met, based on the mapping relationship between preset SOC intervals, target temperature thresholds and battery pack life. Finally, the thermal management is performed by the thermal managing module 404 on the battery pack based on the target temperature threshold, where the thermal management includes cooling the battery pack so that the temperature of the battery pack is lower than the target temperature threshold. That is to say, it is unnecessary to continue the cooling of the battery pack as long as the temperature of the battery pack is lower than the target temperature threshold; otherwise, the battery pack would be overly cooled, resulting in the waste of energy consumed by cooling. At the same time, because the target temperature threshold is the temperature corresponding to the SOC range under the condition that the preset battery pack life requirement is met, even if the cooling of the battery pack is not continued, the battery pack life requirement can still be met. Therefore, with the apparatus for controlling the temperature of the battery pack provided by the embodiments of the present application, a balance between battery life and energy consumed by cooling can be realized, so that the energy consumed by cooling is minimized while the battery life is maximized.

The embodiments of the present application further provide a battery management system including a processor, a memory, and a computer program stored on the memory and executable on the processor, where the computer program, when being executed by the processor, implements the steps of the method for controlling the temperature of the battery pack described above.

The embodiments of the present application further provide a computer-readable storage medium having a computer program is stored thereon, where the computer program, when being executed by a processor, implements the steps of the method for controlling the temperature of the battery pack described above.

Although the present application has been described with reference to the preferred embodiments, various modifications may be made thereto and components thereof may be replaced with equivalents without departing from the scope of the present application. In particular, as long as there is no structural conflict, the technical features mentioned in the embodiments can be combined in any manner. This application is not limited to the specific embodiments disclosed herein, instead, it includes all technical solutions that fall within the scope of the claims.

What is claimed is:

1. A method for controlling a temperature of a battery pack, comprising:
    detecting a SOC of the battery pack;
    determining a SOC interval in which the SOC is located from a plurality of preset SOC intervals;
    determining a target temperature threshold corresponding to the SOC interval under a condition that a preset battery pack life requirement is met, based on a mapping relationship between preset SOC intervals, target temperature thresholds and battery pack life; and
    performing thermal management on the battery pack based on the target temperature threshold;
    wherein the performing thermal management on the battery pack based on the target temperature threshold comprises:
    cooling the battery pack based on the target temperature threshold.

2. The method according to claim 1, wherein before the determining a target temperature threshold corresponding to the SOC interval, based on a mapping relationship between preset SOC intervals, target temperature thresholds and battery pack life, the method further comprises:
    determining a mapping relationship of battery pack life with average battery pack SOC values and average battery pack temperature values, based on historical SOC data and historical temperature data of a plurality of battery packs meeting the preset battery pack life requirement;
    determining an average temperature value interval corresponding to each SOC interval of the plurality of preset SOC intervals under the condition that the preset battery pack life requirement is met, based on the mapping relationship of battery pack life with average battery pack SOC values and average battery pack temperature values; and
    determining a minimum temperature in the average temperature value interval corresponding to each SOC interval of the plurality of preset SOC intervals as a target temperature threshold corresponding to the respective SOC interval, so that the mapping relationship between preset SOC intervals, target temperature thresholds and battery pack life is obtained.

3. The method according to claim 2, wherein the determining a mapping relationship of battery pack life with average battery pack SOC values and average battery pack temperature values, based on historical SOC data and historical temperature data of a plurality of battery packs meeting the preset battery pack life requirement specifically comprises:
    calculating an average value of historical SOC data and an average value of historical temperature data of each battery pack of the plurality of battery packs meeting the preset battery pack life requirement, to obtain an average SOC value and an average temperature value of each battery pack of the plurality of battery packs; and
    obtaining the mapping relationship of battery pack life with average battery pack SOC values and average battery pack temperature values, based on the average SOC value and the average temperature value of each battery pack of the plurality of battery pack.

4. The method according to claim 1, wherein before the determining a SOC interval in which the SOC is located from a plurality of preset SOC intervals, the method further comprises:
    acquiring historical SOC data of a plurality of battery packs with different battery life;
    calculating an average value of historical SOC data of each battery pack of the plurality of battery packs, to obtain an average SOC value of each battery pack of the plurality of battery packs;
    determining a mapping relationship between average battery pack SOC values and battery pack capacity retention ratios, based on the average SOC value of each battery pack and a capacity retention ratio of each battery pack at the end of life of the battery pack; and determining the plurality of preset SOC intervals, based on the mapping relationship between average battery pack SOC values and battery pack capacity retention ratios.

5. The method according to claim 4, wherein the determining the plurality of preset SOC intervals, based on the mapping relationship between average battery pack SOC values and battery pack capacity retention ratios specifically comprises:
    obtaining a variation curve of battery pack capacity retention ratio versus average SOC value, based on the mapping relationship between average battery pack SOC values and battery pack capacity retention ratios;
    acquiring a SOC interval point on the variation curve of battery pack capacity retention ratio versus average SOC value, wherein a slope change rate of the variation curve of battery pack capacity retention ratio versus average SOC value at the SOC interval point is greater than a preset change threshold;
    dividing, based on the SOC interval point, the variation curve of battery pack capacity retention ratio versus average SOC value into a plurality of curve segments; and
    determining a plurality of SOC intervals corresponding to the plurality of curve segments as the plurality of preset SOC intervals.

6. The method according to claim 1, wherein the cooling the battery pack specifically comprises:
    determining a cooling-enabling threshold corresponding to the SOC interval, wherein the cooling-enabling threshold is greater than or equal to the target temperature threshold corresponding to the SOC interval;
    enabling cooling of the battery pack, when the temperature of the battery pack is greater than or equal to the cooling-enabling threshold and an electric vehicle where the battery pack is located is in a working state;
    disabling the cooling of the battery pack, when the temperature of the battery pack is less than the cooling-enabling threshold; and
    disabling the cooling of the battery pack, when the electric vehicle where the battery pack is located is in an off-working state.

7. The method according to claim 6, wherein after the enabling cooling of the battery pack, the method further comprises:
    determining a cooling-disabling threshold corresponding to the SOC interval, wherein the cooling-disabling threshold is less than the target temperature threshold corresponding to the SOC interval;
    disabling the cooling of the battery pack, when the temperature of the battery pack is less than the cooling-disabling threshold;
    or,
    acquiring an ambient temperature value of the battery pack;
    disabling the cooling of the battery pack, when the temperature of the battery pack is less than a larger one of the cooling-disabling threshold and the ambient temperature value.

8. The method according to claim 1, wherein the plurality of preset SOC intervals comprise:
    an interval A corresponding to a SOC range from 0% to 60%;
    an interval B corresponding to a SOC range from 60% to 70%;
    an interval C corresponding to a SOC range from 70% to 80%; and
    an interval D corresponding to a SOC range from 80% to 100%.

9. The method according to claim 8, wherein
    a target temperature threshold corresponding to the interval A is $T_{C1}$ ranging from 43° C. to 47° C.;
    a target temperature threshold corresponding to the interval B is $T_{C2}$ ranging from 39° C. to 43° C.;
    a target temperature threshold corresponding to the interval C is $T_{C3}$ ranging from 29° C. to 39° C.; and
    a target temperature threshold corresponding to the interval D is $T_{C4}$ ranging from 27° C. to 29° C.

10. An apparatus for controlling a temperature of a battery pack, comprising:
    a detecting module configured to detect a SOC of the battery pack;
    a first determining module configured to determine a SOC interval in which the SOC is located from a plurality of preset SOC intervals;
    a second determining module configured to determine a target temperature threshold corresponding to the SOC interval under a condition that a preset battery pack life requirement is met, based on a mapping relationship between preset SOC intervals, target temperature thresholds and battery pack life; and
    a thermal managing module configured to perform thermal management on the battery pack based on the target temperature threshold;
    wherein the thermal managing module is specifically configured to cool the battery pack based on the target temperature threshold.

11. A battery management system comprising a processor, a memory, and a computer program stored on the memory and executable on the processor, wherein the computer program when being executed by the processor implements the method for controlling the temperature of the battery pack according to claim 1.

12. A computer-readable storage medium having a computer program is stored thereon, wherein the computer program, when being executed by a processor, implements the method for controlling the temperature of the battery pack according to claim 1.

* * * * *